US011431525B2

(12) United States Patent
Duda et al.

(10) Patent No.: US 11,431,525 B2
(45) Date of Patent: Aug. 30, 2022

(54) METHOD AND SYSTEM FOR PROCESSING ENCAPSULATED WIRELESS TRAFFIC

(71) Applicant: Arista Networks, Inc., Santa Clara, CA (US)

(72) Inventors: Kenneth James Duda, Santa Clara, CA (US); Venkata Ramchandra Murthy Jonnalagadda, Sunnyvale, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/131,544

(22) Filed: Dec. 22, 2020

(65) Prior Publication Data
US 2021/0152393 A1 May 20, 2021

Related U.S. Application Data

(63) Continuation of application No. 16/430,393, filed on Jun. 3, 2019, now Pat. No. 10,904,035.

(51) Int. Cl.
*H04L 12/46* (2006.01)
(52) U.S. Cl.
CPC ...... *H04L 12/4633* (2013.01); *H04L 12/4641* (2013.01)
(58) Field of Classification Search
None
See application file for complete search history.

(56) References Cited

U.S. PATENT DOCUMENTS

| 6,665,718 | B1* | 12/2003 | Chuah | H04W 36/0011 709/227 |
|---|---|---|---|---|
| 8,036,161 | B2 | 10/2011 | Nagarajan et al. | |
| 8,798,055 | B1 | 8/2014 | An | |
| 9,240,898 | B1 | 1/2016 | Melman | |
| 10,298,717 | B2 | 5/2019 | Hooda et al. | |
| 2006/0120374 | A1* | 6/2006 | Yoshimoto | H04L 12/2881 370/395.2 |
| 2007/0064673 | A1* | 3/2007 | Bhandaru | H04W 40/246 370/351 |
| 2013/0083782 | A1 | 4/2013 | Murphy et al. | |
| 2015/0009992 | A1* | 1/2015 | Zhang | H04L 12/4625 370/392 |
| 2015/0082418 | A1* | 3/2015 | Gu | H04L 12/4633 726/15 |

(Continued)

OTHER PUBLICATIONS

Arista "VXLAN Pseudowires" 2016 retrireved from https://www.arista.com/assets/data/pdf/whitepapers/VxLAN_Pseudowires_WP.pdf (Year: 2016).*

(Continued)

*Primary Examiner* — Jamaal Henson
(74) *Attorney, Agent, or Firm* — Fountainhead Law Group P.C.

(57) ABSTRACT

A method and system for processing network traffic data units (NTDUs) is disclosed. The method includes establishing a virtual tunnel between a wireless access point (WAP) and a network device. A NTDU is received by the WAP from a client device, and the virtual tunnel is identified upon which to transmit the NTDU based on a header of the NTDU according to a policy. The policy maps a portion of the header to a plurality of available virtual tunnels. The NTDU is transmitted, via the virtual tunnel, to the network device.

19 Claims, 6 Drawing Sheets

(56) References Cited

U.S. PATENT DOCUMENTS

| | | | |
|---|---|---|---|
| 2015/0124821 A1 | 5/2015 | Chu et al. | |
| 2015/0350084 A1* | 12/2015 | DeCusatis | H04L 47/12 370/237 |
| 2016/0119156 A1 | 4/2016 | Drake et al. | |
| 2017/0019428 A1 | 1/2017 | Cohn | |
| 2017/0223756 A1 | 8/2017 | Sebastian et al. | |
| 2017/0373883 A1* | 12/2017 | Guo | H04L 12/4633 |
| 2018/0123827 A1* | 5/2018 | Josyula | H04L 12/4633 |
| 2020/0067841 A1 | 2/2020 | Miu et al. | |
| 2020/0162344 A1 | 5/2020 | Zapponi et al. | |

OTHER PUBLICATIONS

Arista, VXLAN Pseudowires, VXLAN Pseudowires, Sep. 27, 2016, pp. 1-4,, 2016 (4 pages).

Mahalingam et al.; "Virtual extensible Local Area Network (VXLAN): A Framework for Overlaying Virtualized Layer 2 Networks over Layer 3 Networks"; RFC: 7348; Aug. 2014.

\* cited by examiner

METHOD AND SYSTEM FOR PROCESSING ENCAPSULATED WIRELESS TRAFFIC

CROSS-REFERENCE TO RELATED APPLICATIONS

This application is a continuation of U.S. patent application Ser. No. 16/430,393, filed Jun. 3, 2019. U.S. patent application Ser. No. 16/430,393 is hereby incorporated by reference in its entirety.

BACKGROUND

Various mechanisms are used to route and/or forward network traffic within a network. Network resources are required to implement these mechanisms. In networks that include wired and wireless network resources, the management of the varying types of resources required to implement the aforementioned mechanisms is complex.

SUMMARY

In general, in one aspect, the invention relates to a method for processing network traffic data units (NTDUs). The method includes receiving, by a wireless access point (WAP), a NTDU from a client device, identifying a virtual tunnel upon which to transmit the NTDU, wherein the virtual tunnel is associated with a network device, and transmitting, via the virtual tunnel, the NTDU to the network device.

In general, embodiments of the invention relate to a method for processing network traffic data units (NTDUs). The method includes receiving, by a network device, an encapsulated NTDU from a wireless access point (WAP) via a virtual tunnel, obtaining the NTDU from the encapsulated NTDU, and processing the NTDU by the network device.

In general, embodiments of the invention relate to a wireless access point (WAP) comprising a processor, an antenna, a physical network interface, and memory comprising computer readable program code, wherein when computer readable program code is executed by the processor, the WAP performs a method, the method comprising receiving, via the antenna, a network traffic data unit (NTDU) from a client device, identifying a virtual tunnel upon which to transmit the NTDU, wherein the virtual tunnel is associated with a network device, and transmitting, via the virtual tunnel and the physical network interface, the NTDU to the network device.

DETAILED DESCRIPTION

Figure 1:
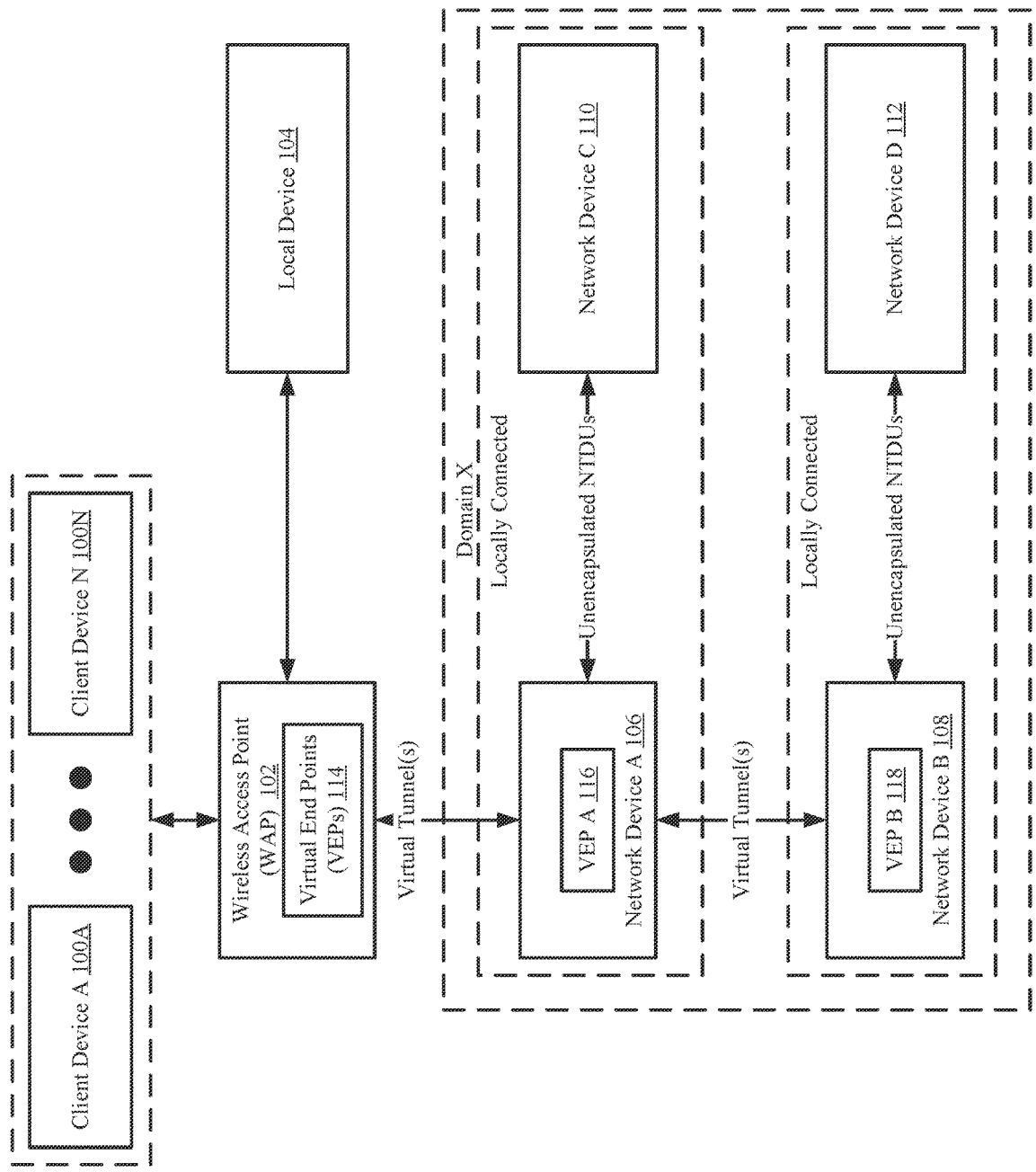
FIG. 1 shows a system in accordance with one or more embodiments of the invention.

Specific embodiments will now be described with reference to the accompanying figures. In the following description, numerous details are set forth as examples of the invention. It will be understood by those skilled in the art, and having the benefit of this Detailed Description, that one or more embodiments of the present invention may be practiced without these specific details and that numerous variations or modifications may be possible without departing from the scope of the invention. Certain details known to those of ordinary skill in the art may be omitted to avoid obscuring the description.

Further, in the following description of the figures, any component described with regard to a figure, in various embodiments of the invention, may be equivalent to one or more like-named components shown and/or described with regard to any other figure. For brevity, descriptions of these components may not be repeated with regard to each figure. Thus, each and every embodiment of the components of each figure, or that is otherwise described herein, is incorporated by reference and assumed to be optionally present within every other figure and/or embodiment having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure and/or embodiment.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to systems and methods for receiving and processing network traffic data units (NTDUs). Specifically, embodiments of the invention relate to processing NTDUs received by wireless access points (WAPs) and then transmitting the received NTDUs, via a virtual tunnel, to a network device in a network. The network devices may then decapsulate and process the NTDUs, where the processing may include further encapsulation of the NTDUs within the network to transmit the NTDU to the appropriate virtual endpoint (VEP). Depending on the configuration of the network, the VEP may be in the same domain (e.g., same layer-2 domain), or in a different domain, than the network device that received the NTDU from the WAP. Embodiments enable NTDUs from WAPs to be transmitted to a network (e.g., an edge of a network) without requiring the WAP to participate in any learning about the location of destinations within the network. In this manner, various embodiments of the invention may utilize encapsulation from the WAP through to the ultimate destination of the NTDU without the WAP experiencing any overhead related to "learning" about the network.

In one or more embodiments of the invention, a NTDU is any relevant data that is transmitted in a format dictated by any one or more network protocols or standards over any wired or wireless transmission medium (or any combination thereof). Examples of such protocols or standards include, but are not limited to, Internet Protocol (IP), Media Access Control (MAC), Transmission Control Protocol (TCP), User Datagram Protocol (UDP), Infiniband, Hypertext Transfer Protocol (HTTP), the IEEE 802.11 family of protocols, etc.

In one or more embodiments of the invention, the relevant data is at least a portion of the payload of a NTDU of any format.

FIG. 1 shows a system in accordance with one or more embodiments of the invention. As shown in FIG. 1, the system includes one or more client devices (100A, 100N), one or more network devices (e.g., network device A (106), network device B (108), network device C (110), and network device D (112)), a WAP (102), and one or more local devices (e.g., local device (104). Each of these components is described below.

In one or more embodiments of the invention, one or more client devices (100A, 100N), may be implemented as computing devices. In one or more embodiments of the invention, a computing device is any device or any set of devices capable of electronically processing instructions and that includes, at least, one or more processors, memory, input and output device(s), and operative network connectivity to one or more network devices or one or more WAPs. Examples of computing devices include, but are not limited to, a server (e.g., a blade-server in a blade-server chassis, a rack server in a rack, etc.), a virtual machine (VM), a desktop computer, a mobile device (e.g., laptop computer, smart phone, personal digital assistant, tablet computer and/or any other mobile computing device), a network device (e.g., switch, router, multi-layer switch, etc.) and/or any other type of computing device with the aforementioned requirements.

In one embodiment of the technology, one or more client devices (100A, 100N) includes functionality to communicate with one or more WAPs (e.g., 102). Communicating with the WAPs may include functionality to send NTDUs to the resource WAP (102) and to receive NTDUs from the WAP (102).

In one or more embodiments of the invention, a network device (e.g., 106, 108, 110, 112) may be a physical device that includes, but is not limited to, all or any subset of the following: persistent storage (not shown), memory (e.g., random access memory (RAM)) (not shown), one or more processor(s) (not shown), one or more network chips, one or more circuit components (e.g., wire, resistors, capacitors, transistors, inductors, integrated circuitry packages, printed circuit boards, diodes, comparators, etc.), one or more field programmable gate arrays (FPGAs), one or more application specific integrated circuits (ASICs), one or more complex programmable logic devices (CPLDs) and/or two or more physical network interfaces (which may also be referred to as ports). A network device may be connected to other devices via wired (e.g., using the ports) and/or wireless connections.

In one or more embodiments of the invention, the one or more network devices (106, 108, 110, 112) include functionality to receive NTDUs at any of the physical network interfaces (i.e., ports) of the network device, and to subsequently transmit NTDUs from any of the physical network interfaces of the network device. The NTDU may be transmitted to other network devices and/or to client devices (not shown) connected to the network device. In one embodiment of the invention the network devices includes functionality to process NTDU in accordance with FIGS. 2-3.

Network devices may also include functionality to inspect all or certain portions of a NTDU in order to determine whether to: (i) drop the NTDU; (ii) process the NTDU (which may include encapsulation); and/or (iii) transmit the NTDU, based on the processing by network device, where the processing may be performed by a hardware component in the network device, software executing on the network device, or any combination thereof.

In one or more embodiments of the invention, the network device includes functionality to store (e.g., in persistent storage, in memory, in a register, etc.), any number of data structures (e.g., filtering information, buffering information, routing information base (RIB), queued and timestamped NTDUs, etc., forwarding information base (FIB), link state database, counters, etc.) for facilitating operation of at least some aspects of the network device.

Such structures may be stored in a data repository (not shown) included in and/or operatively connected to a network device. In one or more embodiments of the invention, a data repository is any type of storage unit(s) and/or device(s) (e.g., a file system, database, collection of tables, or any other storage mechanism) for storing data. Further, the data repository may include multiple different storage units and/or devices. The multiple different storage units and/or devices may or may not be of the same type or located at the same physical site. In one or more embodiments of the invention, the network device data repository includes all or any portion of the persistent and/or non-persistent storage of the network device as described above.

Examples of network devices include, but are not limited to, a layer 2 network switch, a router, a multilayer switch, a fiber channel device, an InfiniBand® device, etc.

In one or more embodiments of the invention, the local devices (e.g., 104) may be implemented as network devices (described above) and/or computing devices (described above). The local devices include functionality to receive NTDUs with or without virtual local area network (VLAN) tags from the WAP (102).

In one or more embodiments of the invention, a WAP (102) may be implemented as network device with one or more antennae. The antennae enables the WAP to receive and transmit NTDUs to one or more client devices (100A, 100N) over a wireless transmission medium. When sending and receiving NTDUs via the wireless transmission medium, the NTDUs may be transmitted in accordance with a wireless communication standard such as IEEE 802.11 family of protocols. Other wireless communication standards and/or protocols may be used without departing from the invention.

In one or more embodiments of the invention, the WAP transmits NTDUs to, and receives NTDUs from, one or more local devices via one or more physical network interfaces (not shown) on the WAP. Further, the WAP transmits NTDUs to and receives NTDUs from one or more network devices (e.g., 106, 108, 110, 112).

In one or more embodiments, the WAP (102) may use a virtual tunnel to transmit NTDUs to (and receive NTDUs from) network devices (106, 108, 110, 112). For example, a virtual end point (114) executing (or otherwise implemented on the WAP) may encapsulate the NTDU using an encapsulation protocol (e.g., virtual extensible local area network (VXLAN), generic routing encapsulation (GRE), multiprotocol label switching (MPLS), etc.) and then transmit the encapsulated NTDU to a network device. Unlike standard encapsulation, which requires that the encapsulated NTDU is transmitted to a network device that is locally connected to the destination of the NTDU, the encapsulation and transmission by the WAP transmits the NTDU to a preconfigured destination (i.e., to a specific network device) regardless of the actual destination of the NTDU.

The network device, as described below in FIG. 3, may then further process the NTDU to transmit it towards its ultimate destination (which may or may not include encapsulation). In one embodiment of the invention, the network device (e.g., 106) that received the encapsulated from the WAP includes a VEP (e.g., 116) that decapsulates the encapsulated NTDU received over the virtual tunnel. Unlike the VEP executing on the WAP, the VEP (e.g., 116, 118) executing on the network devices include functionality to "learn" destinations associated with the operatively connected network devices (e.g., 106, 108, 110, 112). In one embodiment of the invention, the VEPs (e.g., 116, 118) executing on the network devices are virtual tunnel end points (VTEPs) that implement the VXLAN protocol. The VEPs may implement other encapsulation protocols (e.g., GRE, MPLS) without departing from the invention. Additional detail about the functionality of the various VEPs is provided in FIGS. 2 and 3.

In one embodiment of the invention, the network devices (e.g., 106, 108, 110, 112) the may be in the same domain (e.g., layer-2 domains; Domain X in FIG. 1), in different domains (not shown), or a combination thereof (not shown). The manner in which NTDUs are transmitted between the various network devices depends on the domain(s) in which the network device resides as well as how the network devices are connected. For example, the NTDUs that are transmitted between the network devices may be encapsulated or unencapsulated even when the network devices are in the same domain. When the network devices (e.g., 106, 110) are locally connected (e.g., there is direct physical connection between the network devices), then the NTDUs may be transmitted without encapsulation. However, when the network devices (e.g., 106, 108) are not locally connected but within the same domain, then in accordance with one or more embodiments of the invention the NTDUs are transmitted as encapsulated NTDUs. Additional detail is provided below with respect to FIG. 3.

In one or more embodiments of the invention, any above-described system component may also include software and/or firmware stored in any data repository (not shown) and/or memory (not shown) (i.e., non-transitory computer readable mediums). Such software and/or firmware may include instructions which, when executed by one or more processors (not shown) included in and/or operatively connected to the component, cause the one or more processors to perform all or a portion of the methods/functionality described in this application in accordance with one or more embodiments of the invention.

The instructions may be in the form of computer readable program code to perform embodiments of the invention, and may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform functionality related to embodiments of the invention.

While FIG. 1 shows a configuration of components, other configurations may be used without departing from the scope of the invention. For example, there may be any number of client devices, WAPs, network devices, local devices, etc., which may be arranged in any manner. Accordingly, embodiments disclosed herein should not be limited to the configuration of components shown in FIG. 1.

Figure 2:
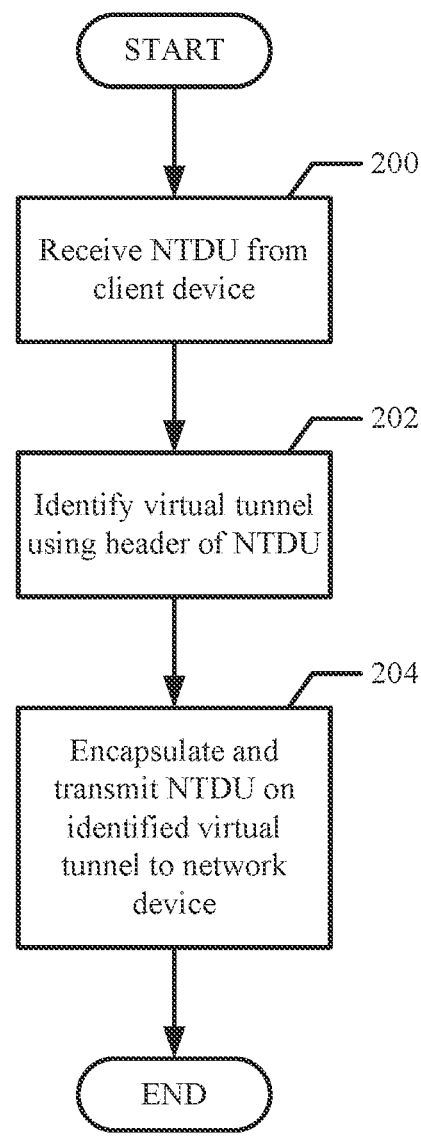
FIG. 2 shows a flowchart in accordance with one or more embodiments of the invention.
Figure 3:
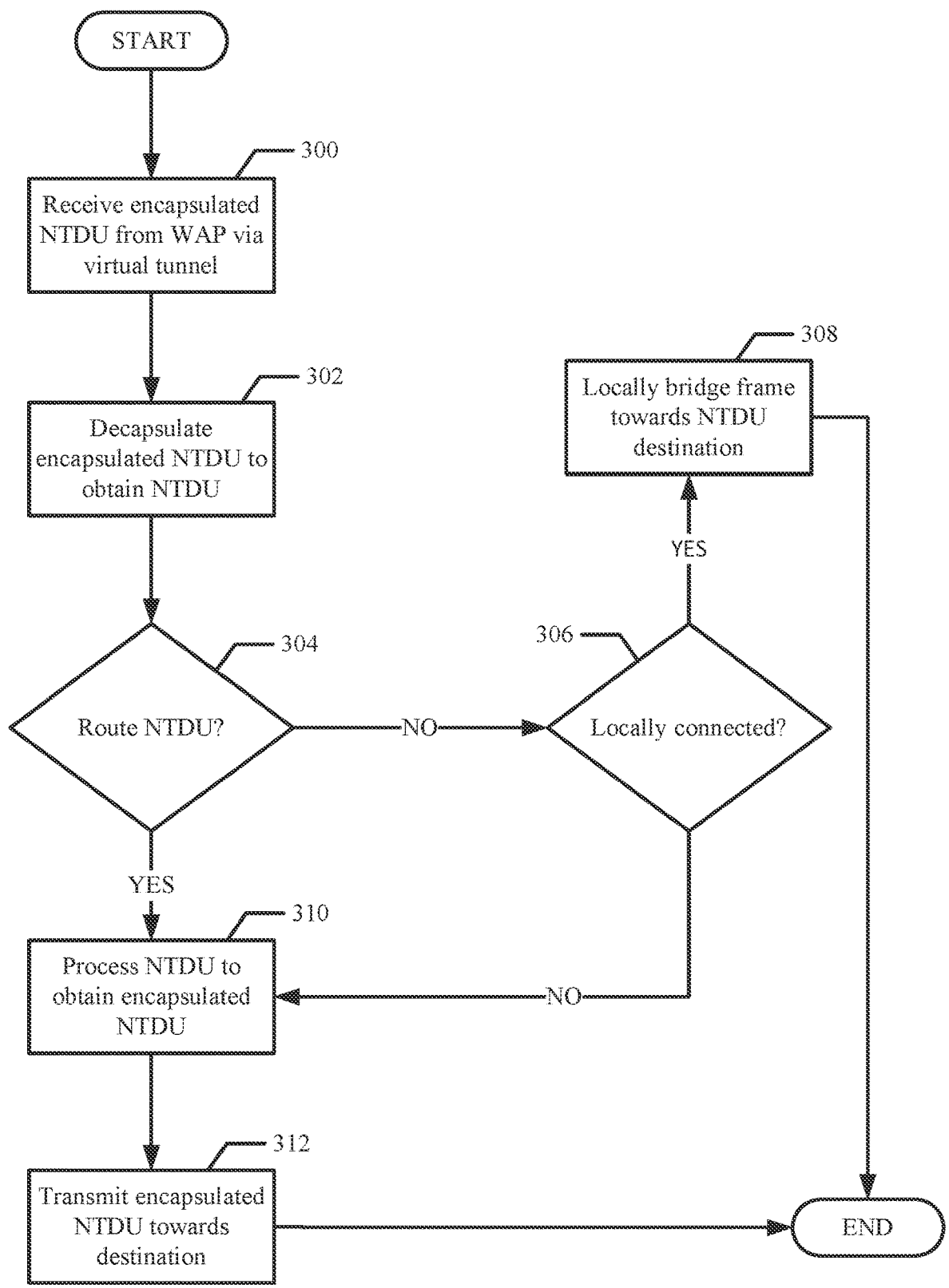
FIG. 3 shows a flowchart in accordance with one or more embodiments of the invention.

FIGS. 2-3 show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2-3 may be performed in parallel with any other steps shown in FIGS. 2-3 without departing from the scope of the invention.

FIG. 2 shows a method for transmitting NTDUs in accordance with one or more embodiments of the invention. The method shown in FIG. 2 may be performed, for example, by a WAP.

Turning to FIG. 2, in step 200, a NTDU is received by a WAP from a client device. The client device may receive the NTDU via an antenna on the WAP.

In step 202, the NTDU is analyzed to determine whether to: (i) transmit the NTDU to a local device (see e.g., FIG. 1, 104) or (ii) to transmit the NTDU to a network device via a virtual tunnel. The analysis about whether to select option (i) or (ii) may be performed using at least a portion of the contents of a header of the NTDU. For example, the WAP may use the source internet protocol (IP) address, the destination IP address, a tag within the header of the NTDU, any other portion of the header of the NTDU, or any combination thereof to make the aforementioned determination.

Continuing with the discussion of step 202, the analysis may use the aforementioned contents of the header of the NTDU in order to determine: (a) that the NTDU should be sent via a physical network interface to a local device; (b) that the NTDU should be tagged with an appropriate VLAN tag and then sent via a physical network interface to a local device; or (c) that the NTDU should be sent via a virtual tunnel to a network device.

With respect to (c), as discussed above, the WAP may encapsulate and transmit the NTDU to a network device via a virtual tunnel. The virtual tunnel that is used to transmit the encapsulated NTDU to the network device is a point-to-point virtual tunnel. Said another way, the virtual tunnel is pre-configured between the WAP and a particular network device such that all encapsulated NTDUs that are transmitted in the tunnel will reach the particular network device, regardless of the content of the header of the NTDU. In one embodiment of the invention, the virtual tunnel between the WAP and the particular network device may be implemented as a VXLAN pseudowire. The aforementioned virtual tunnel may implemented using other protocols without departing from the invention.

If, based on the above analysis, the NTDU is to be transmitted to the network device via a virtual tunnel, then a determination is made about which virtual tunnel to use for the transmission of the NTDU; said another way, virtual tunnel is identified. If there is only one configured virtual tunnel then the NTDU is transmitted via this virtual tunnel. However, if there are multiple virtual tunnels, then the WAP may implement a policy to select a virtual tunnel of the set of virtual tunnels to use to transmit the NTDU.

In this scenario, the WAP, using the header of the NTDU (or a portion thereof) may select a particular virtual tunnel from the set of available virtual tunnels based on a policy. In one embodiment of the invention, the policy may be implemented as a look-up table, where the policy maps portions of the header of the NTDU to a given virtual tunnel. For example, NTDUs with source IP addresses within a first range may be transmitted to a first network device via a first virtual wire while NTDUs with source IP addresses within a second range may be transmitted to a second network device via a second virtual wire. The invention is not limited to the aforementioned policy; rather, any policy may be used to select a virtual wire upon which to transmit the NTDU. Further, there may be any number of pre-configured virtual tunnels that connect the WAP to one or more network devices, where the network devices may be the same or different domains. In another embodiment of the invention, the virtual tunnel may be identified using metadata associated with the NTDU that is to be transmitted via the virtual tunnel. The metadata may include, but is not limited to, (i) the wireless frequency (also referred to as a wireless frequency band) (e.g., 2.4 GHz, 5 GHz, etc.) over which the NTDU was transmitted from the client to the WAP; (ii) the wireless channel (i.e., the portion of the wireless frequency band) over which the NTDU was transmitted from the client to the WAP; (iii) a service set identifier (SSID) of the wireless network over which the NTDU was transmitted from the client to the WAP; (iv) client vendor/brand, (v) client device type, (vi) current operating system version executing on the client, (vii) authentication state (e.g., authenticated or unauthenticated) of the client, and/or (viii) authentication method being implemented on the client. Other metadata may be used without departing from the invention. Further, any combination of metadata, any combination of portions of the NTDU, and/or any combination of metadata and portion(s) of the NTDU may be used to identify the virtual channel without departing from the invention.

Continuing with the discussion of FIG. 2, in step 204, if the NTDU is to be transmitted to a network device via a virtual tunnel, then the NTDU is encapsulated and transmitted from the VEP of the WAP to a VEP of network device via the identified virtual tunnel. Though not shown in FIG. 2, if the NTDU is to be transmitted to a local device, then the NTDU is transmitted (with or without a VLAN tag) to the local device.

FIG. 3 shows a method for processing NTDUs by a network device in accordance with one or more embodiments of the invention. The method shown in FIG. 3 may be performed by any network device upon receipt of an encapsulated NTDU via virtual tunnel that originated from a WAP.

Turning to FIG. 3, in step 300, the encapsulated NTDU is received from the WAP by the network device via the virtual tunnel.

In step 302, the encapsulated NTDU is decapsulated to obtain the NTDU.

In step 304, a determination is made as to whether the NTDU is to be routed or bridged. This determination may be made based the contents of at least a portion of the header of the NTDU. For example, if the NTDU is a frame, then the determination in step 304 may be based on analyzing the destination media access control (MAC) address of the NTDU. If, based on the analysis, the NTDU needs to be routed (e.g., because the destination of the NTDU is in a different L2 domain than the L2 domain of the network device that received the NTDU), then process proceeds to step 310; otherwise, the NTDU needs to be bridged (e.g., because the destination of the NTDU is in the same L2 domain as the network device that received the NTDU) and the process proceeds to step 306.

While the NTDU is to be bridged, the NTDU destination may be associated with a locally connected network device or a remotely connected network device that is in the same domain. Accordingly, in step 306 a determination is made about whether the NTDU destination is reachable via a locally connected network device. If the NTDU destination is reachable via a locally connected network device, then the process proceeds to step 308; otherwise, the process proceeds to step 310.

In one or more embodiments, the aforementioned determination is required to be made for bridging scenarios because the network device that received the NTDU from the WAP may be not be locally connected to the NTDU destination. Said another way, while the WAP uses encapsulation to transmit the NTDU to the network device, because the WAP transmits the NTDU using a virtual tunnel that is preconfigured to, regardless of the destination of the NTDU, transmit the NTDU to a preconfigured network device. As a result, and contrary to the operation of other encapsulation schemes (e.g., VXLAN, GRE), the NTDU does not reach the network device that is locally connected to the NTDU destination. Accordingly, and again contrary to the operation of other encapsulation schemes (e.g., VXLAN, GRE), the network device may need to reencapsulate the NTDU for transmission within the same layer-2 domain.

In step 308, the network device bridges the NTDU towards the NTDU destination. In one embodiment of the invention, the NTDU is bridged to a locally connected network device without a VLAN tag. In another embodiment of the invention, the NTDU is bridged to a locally connected computing device once a VLAN tag is added to the NTDU.

Returning to step 304, if the NTDU needs to be routed or bridged to non-locally connected network device, then in step 310, the NTDU is processed to obtain an encapsulated NTDU. However, the processing and encapsulation of the NTDU varies based on the whether the NTDU is to be routed or bridged.

If the NTDU is to be routed, then the header of the NTDU is used to route the NTDU to the appropriate domain. For example, the destination IP address in the NTDU is used to determine where to route the NTDU. The contents of the encapsulated NTDU is then generated based on where the NTDU is being routed. For example, if the encapsulation is performed in accordance with the VXLAN protocol, then the header of the encapsulated NTDU may include a VNI for the domain in which the NTDU destination is located as well as the VTEP IP address of a VTEP in the aforementioned layer-2 domain.

However, if the NTDU is to be bridged, then a lookup is performed to identify the destination VEP (e.g., a destination VTEP) on a network device from which the NTDU may be locally bridged to the NTDU destination. Unlike the routing scenario, the destination VEP is in the same layer-2 domain as the source VEP (i.e., the VEP that is on the network device that initially received the NTDU from the WAP). Based on the result of the lookup, the contents of the encapsulated NTDU is then generated. For example, if the encapsulation is performed in accordance with the VXLAN protocol, then the header of the encapsulated NTDU may include a VNI of the current layer-2 domain as well as the VTEP IP address of the aforementioned destination VTEP.

In step 312, the encapsulated NTDU generated in step 310 is transmitted towards the NTDU destination.

Example

Figure 4A:
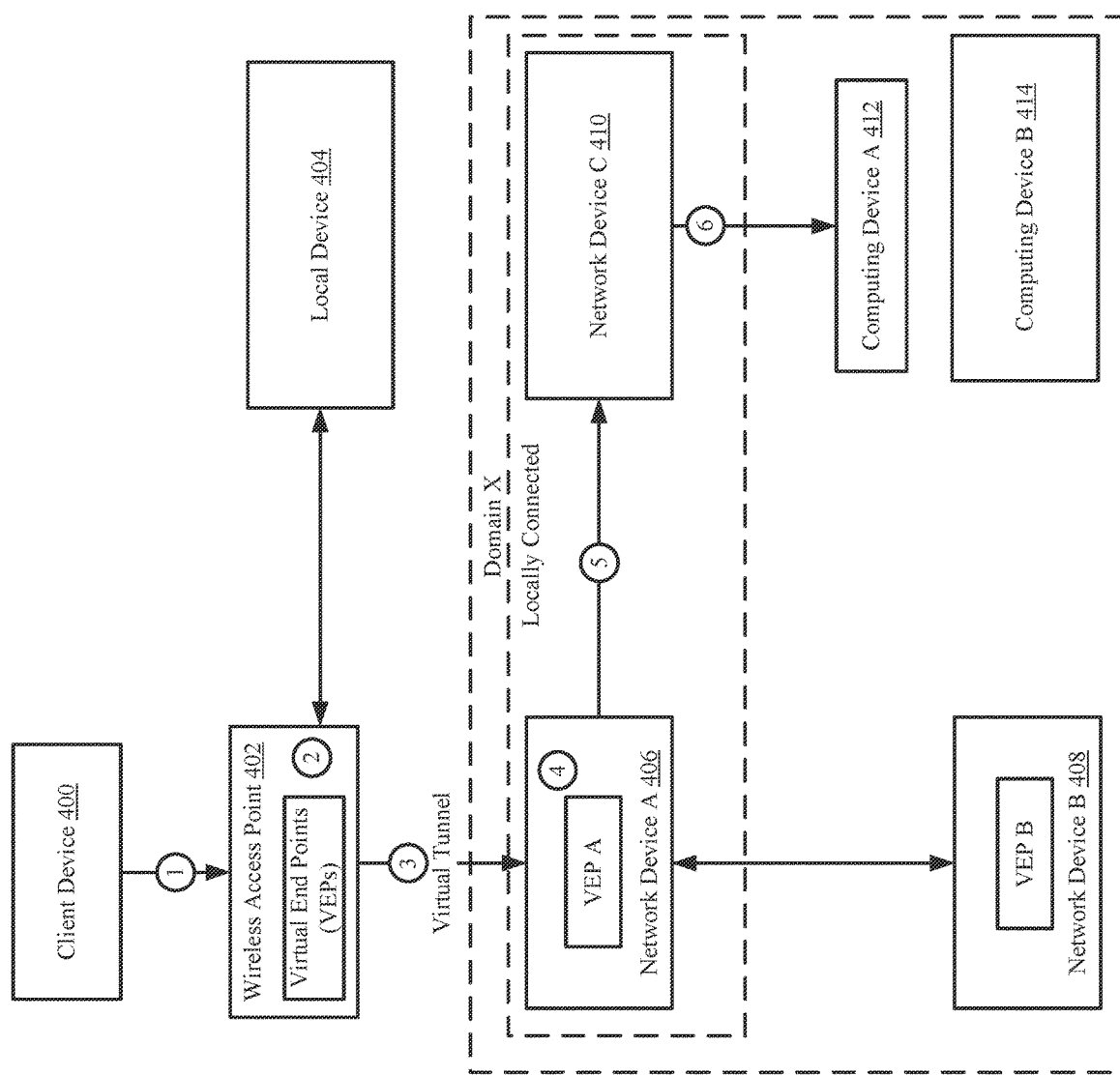
FIGS. 4A-4C show an example in accordance with one or more embodiments of the invention.
Figure 4B:
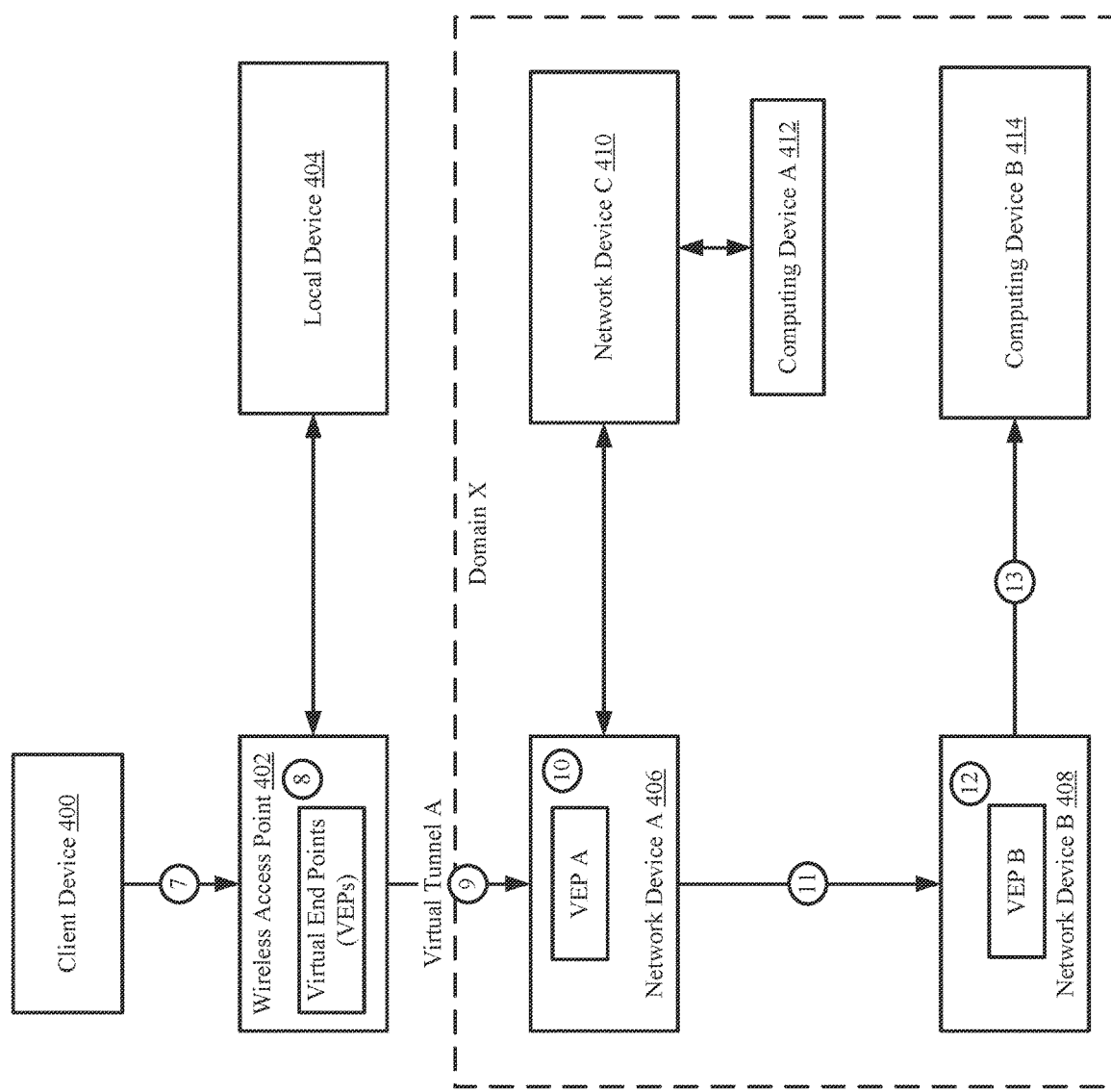
Figure 4C:
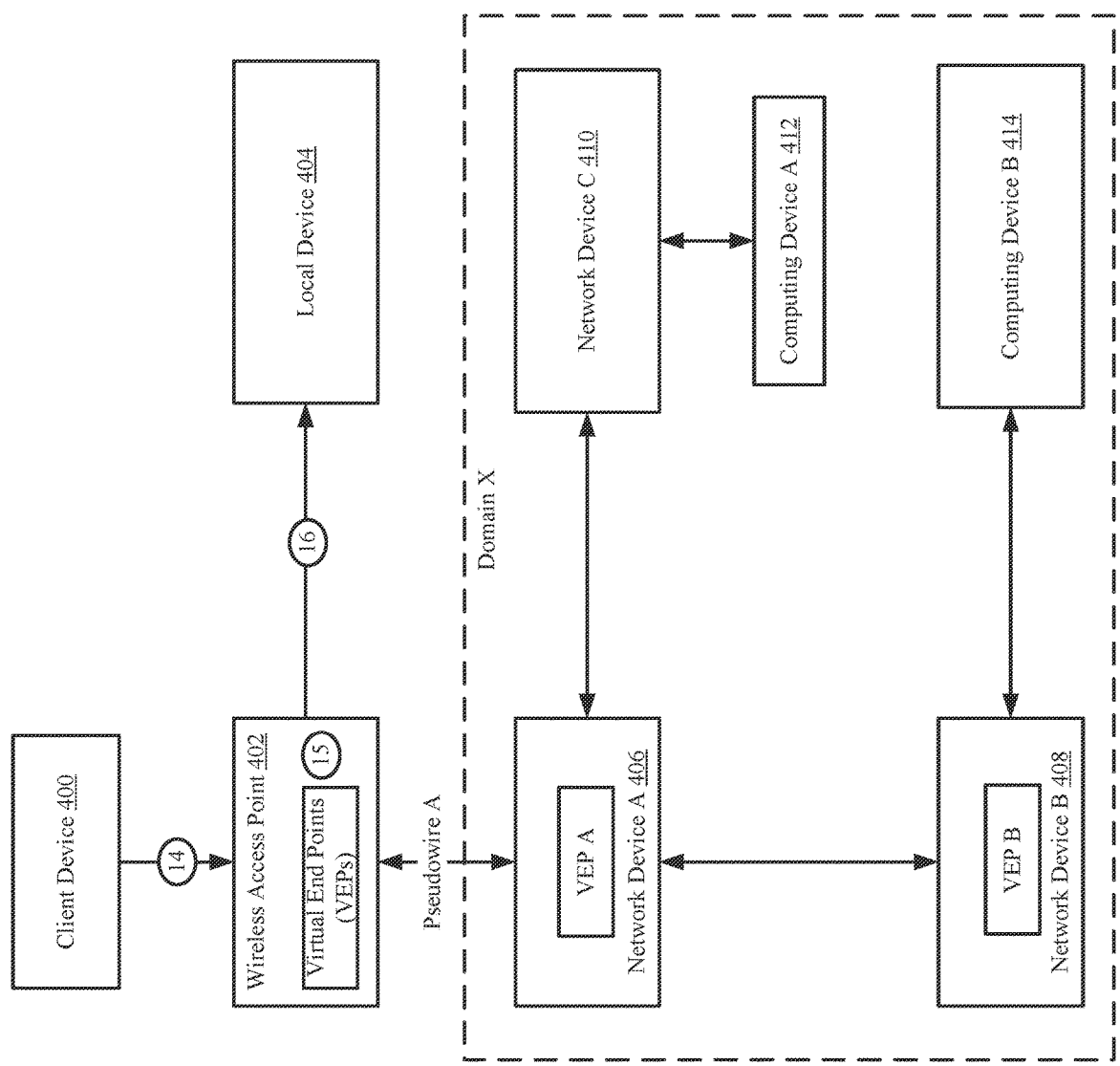

FIGS. 4A-4C show an example in accordance with one or more embodiments of the invention. The following example is for explanatory purposes only and not intended to limit the scope of the invention.

Referring to FIG. 4A, consider a scenario for processing NTDUs in which a client device (400) is communicating over a wireless transmission medium with a WAP (402). The WAP (402) is operatively connected to network device A (406) and a local device (404). The network device A (406) is operatively connected to network device C (410).

The following describes a scenario for transmitting and processing of NTDUs in the aforementioned system.

Turning to the example, (1) the WAP (402) receives the NTDU from a client device (400).

(2) In accordance with FIG. 2, the WAP (402) identifies the virtual tunnel for processing the NTDU using at least a portion of the header of the NTDU.

(3) The NTDU is encapsulated and the encapsulated NTDU is sent via the virtual tunnel to VEP A of network device A (406).

(4) In accordance with FIG. 3, network device A (406) obtains and decapsulates the encapsulated NTDU to obtain the NTDU. The header of the NTDU is then analyzed to determine the NTDU destination. Network device A (406) determines that the NTDU destination may be reached by locally bridging the NTDU.

(5) Network device A (406) bridges the unencapsulated NTDU to network device C (410).

(6) Network device C (410) bridges the unencapsulated NTDU to computing device A (412), which is the NTDU destination in this scenario.

Referring to FIG. 4B, the following describes another scenario for transmitting and processing of NTDUs in the aforementioned system.

(7) The WAP (402) receives the NTDU from a client device (400).

(8) In accordance with FIG. 2, the WAP (402) identifies the virtual tunnel for processing the NTDU using at least a portion of the header of the NTDU.

(9) The NTDU is encapsulated and the encapsulated NTDU is sent via the virtual tunnel VEP A of network device A (406).

(10) In accordance with FIG. 3, network device A (406) obtains and decapsulates the encapsulated NTDU to obtain the NTDU. The header of the NTDU is then analyzed to determine the NTDU destination. Network device A (406) determines that the NTDU destination may be reached by bridging the NTDU. However, the NTDU destination cannot be reached by local bridging and, as such, the NTDU needs to be encapsulated and bridged to another network device in the same layer-2 domain (e.g., network device B (408) in this scenario).

(11) Network device A (406) transmits the encapsulated NTDU from VEP A to VEP B of network device B (408).

(12) Network deice B (408) decapsulates the encapsulated NTDU to obtain the NTDU.

(14) The unencapsulated NTDU is then bridged to the NTDU destination, which in this example is computing device B (414).

Referring to FIG. 4C, the following describes another scenario for transmitting and processing of NTDUs in the aforementioned system.

(14) The WAP (402) receives the NTDU from a client device (400).

(15) The WAP (402) determines, based on analyzing the header of the NTDU, that the NTDU destination may be accessed via local bridging from the WAP.

(16) The WAP (402) transmits the NTDU to the local device (404).

End of Example

While various embodiments of the invention have been described with respect to NTDUs origination from the client device and being transmitted to a NTDU destination, embodiments of the invention may also be used to transmit NTDU originating from a computing device (which may be local device) and being transmitted to the client devices. In the latter scenario, the NTDU originating from the computing device would travel on the same path (but in the reverse order) as the NTDU that originated from the client device that was destined for the computing device. For example, referring to FIG. 4A, a NTDU originating from client device A (412) would be transmitted (without encapsulation) to network device C (410) and then to network device A (406). Network device A (406) would analyze at least a portion of the header of the NTDU and, based on the determination, select a virtual tunnel where the destination of the virtual tunnel is preconfigured to WAP (402). Network device A (406) would then encapsulate the NTDU and transmit the encapsulated NTDU to WAP (402). WAP (402) would decapsulate the encapsulated NTDU and then transmit, via the wireless transmission medium and the appropriate wireless transmission protocol, the NTDU to the client (400). The aforementioned description is intended to illustrate one embodiment of the invention but it not intended to limit the scope of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing network traffic data units (NTDUs), comprising:
   receiving, by a wireless access point (WAP), a NTDU from a client device;
   identifying a virtual tunnel upon which to transmit the NTDU based on a header of the NTDU according to a policy, wherein the policy maps a portion of the header to one of a plurality of available virtual tunnels; and
   transmitting, via the virtual tunnel, the NTDU to a network device,
   wherein the portion of the header comprises a source IP address and the policy maps source IP addresses within a first range to a first virtual tunnel of the available virtual tunnels, and source IP addresses within a second range to a second virtual tunnel of the available virtual tunnels.

2. The method of claim 1, wherein the policy is implemented using a look-up table.

3. The method of claim 1, further comprising:
   establishing a second virtual tunnel between the WAP and a second network device, wherein the network device is associated with a layer-2 domain, wherein the second network device is associated with a second layer-2 domain, and wherein the established second virtual tunnel is one of the plurality of available virtual tunnels.

4. The method of claim 1, wherein the identified virtual tunnel is implemented as a virtual extensible local area network (VXLAN) pseudowire.

5. The method of claim 1, wherein the identified virtual tunnel is a virtual extensible local area network (VXLAN) tunnel.

6. The method of claim 1, wherein the plurality of available virtual tunnels includes one or more pre-configured virtual tunnels that connect the WAP to a plurality of network device.

7. A method for processing network traffic data units (NTDUs) comprising:
   receiving, by a wireless access point (WAP), a NTDU from a client device;

identifying a virtual tunnel from among a plurality of available virtual tunnels upon which to transmit the NTDU based on a header of the NTDU according to a policy, wherein the virtual tunnel is associated with a network device; and transmitting, via the virtual tunnel, the NTDU to the network device, wherein identifying the virtual tunnel comprises using metadata associated with the NTDU, wherein the metadata specifies at least one of: a client vendor/brand, a client device type, a current operating system version executing on the client device, a status of authentication state of the client device, and an authentication method being implemented on the client device.

8. The method of claim 7, the method further comprising: establishing a second virtual tunnel between the WAP and a second network device, wherein the network device is associated with a layer-2 domain, wherein the second network device is associated with a second layer-2 domain, and wherein the established second virtual tunnel is one of the plurality of available virtual tunnels.

9. The method of claim 7, wherein the identified virtual tunnel is implemented as a virtual extensible local area network (VXLAN) pseudowire.

10. The method of claim 7, wherein the identified virtual tunnel is a virtual extensible local area network (VXLAN) tunnel.

11. The method of claim 7, wherein the plurality of available virtual tunnels includes one or more pre-configured virtual tunnels that connect the WAP to a plurality of network devices.

12. A system comprising:
a network device;
a wireless access point (WAP), the WAP comprising:
  a processor;
  an antenna;
  a physical network interface; and
  memory comprising computer readable program code;
  wherein when computer readable program code is executed by the processor, the WAP performs a method, the method comprising:
    receiving, by a wireless access point (WAP, a network traffic data units (NTDU) from a client device;
    identifying a virtual tunnel from among a plurality of available virtual tunnels upon which to transmit the NTDU based on a header of the NTDU according to a policy, wherein the virtual tunnel is associated with the network device; and
    transmitting, via the virtual tunnel, the NTDU to the network device,
    wherein identifying the virtual tunnel comprises using metadata associated with the NTDU, wherein the metadata specifies at least one of: a client vendor/brand, a client device type, a current operating system version executing on the client device, a status of authentication state of the client device, and an authentication method being implemented on the client device.

13. The system of claim 12, wherein the policy is implemented using a look-up table stored in the memory.

14. The system of claim 12, wherein:
the policy maps a portion of the header to the plurality of available virtual tunnels, and
the portion of the header comprises a source IP address, and the policy maps source IP addresses within a first range to a first virtual tunnel of the available virtual tunnels;
and source IP addresses within a second range are mapped to a second virtual tunnel of the available virtual tunnels.

15. The system of claim 12, further comprising:
a second network device;
wherein the method further comprises:
  establishing a second virtual tunnel between the WAP and the second network device, wherein the network device is associated with a layer-2 domain, wherein the second network device is associated with a second layer-2 domain, and wherein the established second virtual tunnel is one of the plurality of available virtual tunnels.

16. The system of claim 12, wherein the identified virtual tunnel is a virtual extensible local area network (VXLAN) tunnel.

17. The system of claim 12, wherein the identified virtual tunnel is implemented as a virtual extensible local area network (VXLAN) pseudowire.

18. The system of claim 12, wherein identifying a virtual tunnel upon which to transmit the NTDU comprises:
selecting a virtual tunnel from a plurality of pre-configured virtual tunnels that connect the WAP to a plurality of network devices.

19. The system of claim 12, the method further comprising:
encapsulating the NTDU using an encapsulation protocol.

* * * * *